Feb. 19, 1924.
F. H. BAILEY
PRODUCTION OF LIGHT
Filed May 17, 1921    2 Sheets-Sheet 1
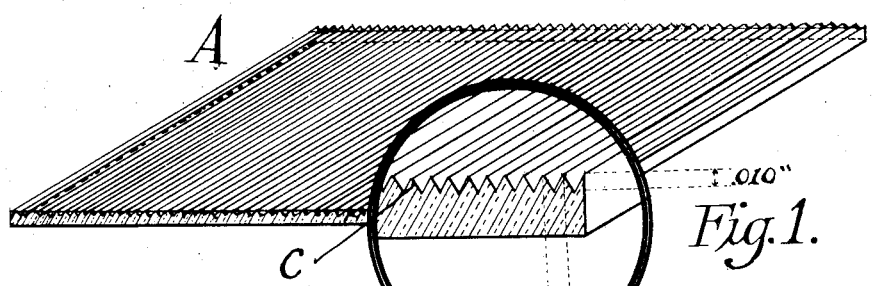
Fig.1.
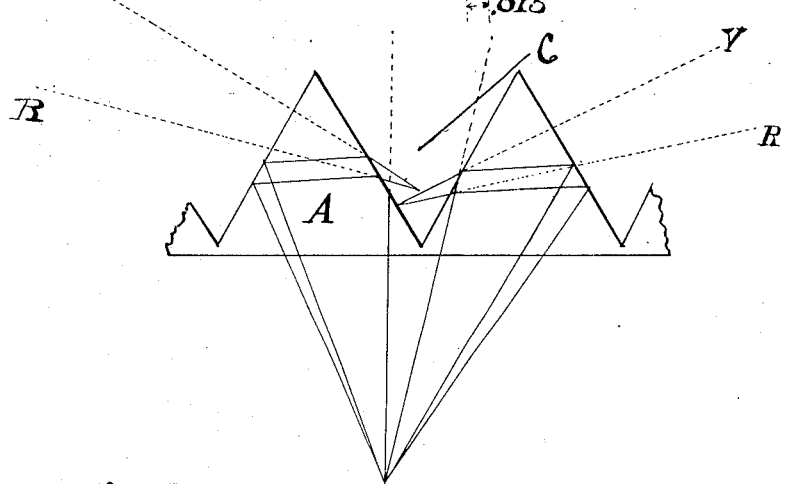
Fig.2.
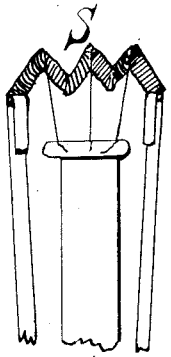
Inventor: Frank H. Bailey Feb. 19, 1924.

F. H. BAILEY 1,484,287

PRODUCTION OF LIGHT

Filed May 17, 1921  2 Sheets-Sheet 2

Inventor: Frank H. Bailey.

Patented Feb. 19, 1924.

1,484,287

UNITED STATES PATENT OFFICE.

FRANK H. BAILEY, OF CINCINNATI, OHIO.

PRODUCTION OF LIGHT.

Application filed May 17, 1921. Serial No. 470,469.

*To all whom it may concern:*

Be it known that I, FRANK H. BAILEY, a citizen of the United States, and a resident of Cincinnati, in the county of Hamilton and State of Ohio, have invented certain new and useful Improvements in the Production of Light, of which the following is a full, clear, and exact description, reference being had to the accompanying drawings, forming part of this specification.

My invention relates to the production of transparent media for the conversion of artificial light to give as close an approximation as possible to the so-called natural day-light, produced by the sun as reacted upon by the atmosphere of the earth.

As is well known, the air acts upon the white light emanating from the sun in such a way as to diffuse and to a certain extent color it. Thus the natural color of the clear sky is a good indication of the effect of the atmosphere on the light of the sun so far as color tendency is concerned.

The artificial light from a burning hydrocarbon is very poor in the violet and blue components of refracted sunlight and this is also true, to a lesser extent of course, of the light from a filament rendered incandescent by the passage therethrough of a current of electricity, or by heating from a Bunsen flame.

These two sources of light are mentioned since they are the common ones practical for interior illumination, for example, the electric arc and incandescent vapor lights are troublesome to take care of and require expensive apparatus.

In my invention I take as the source of light, the incandescent filament, although a gas or oil flame should be included. The light from such a filament has a predominant yellow color, as well as being weak in blue and violet rays, so that my invention has as its object the suppression of the yellow color and the increasing of the blue and violet.

I accomplish my invention by that certain construction and arrangement of parts to be hereinafter more specifically pointed out and claimed, whereby, among other things, I so treat the light emanating from an artificial source as to give it a nature, which upon spectrum analysis will be found to approach the spectrum of day-light or atmosphere-refracted sunlight.

In the drawings,

Figure 1 is a perspective view of a plate of glass constructed according to my invention, same being magnified over its natural size.

Figure 2 is a diagrammatic view illustrating the action of my special glass structure on rays of light from an incandescent filament.

Figure 3:
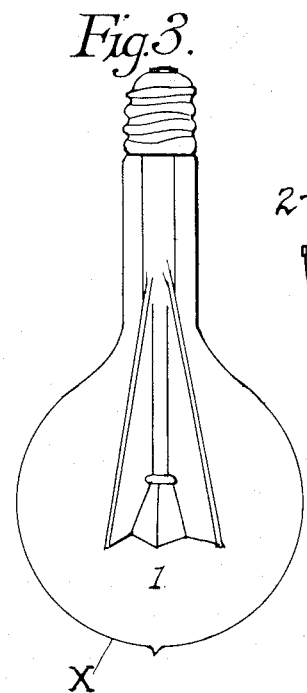
Figure 3 is a view of a special electric light bulb illustrating one aplication of my invention.

As was stated above, it is my object to imitate in an artificial light the same illuminating properties of ordinary daylight, thus providing, among other things, for a true revealing of delicate shadings and colors by artificial light. In art work, display of paintings, display of cloth, this simulation of day-light has special value. Also in view of the fact that the eye is saved the necessity of adjusting itself from the white light of day to the yellowish light of lamps, the use of my invention for all interior and exterior lighting purposes is valuable.

The casting of a single color over all objects viewed as is done by yellow artificial light, forces the eye to use a part only of its forces, thus tiring it and reducing the efficiency of any one working under it.

The use as a searchlight or vehicle light of a ray which throws a substantially pure day-light hue over objects within its beam not only gives a clear illumination but makes it easier to distinguish the exact nature of such objects through the revealing of their normal day-light color.

There are two features to my invention, both of which combine to give a white light from a source fairly rich in yellows and reds and which serve to re-act on artificial light as the atmosphere does on light emanating from the sun.

These two things are,—(1) the provision of a transparent medium for the passage of the light which has a color as close to the blue sky as possible, i. e., of a color which is termed a light ultramarine blue or cerulean blue, and (2) the engraving or otherwise forming on the surface of this glass of a number of very fine grooves, which act by mutal reflection from the groove walls and prismatic action, due to the uneven thickness of the surface, to cut down the red and yellow components of the light.

In describing the theory upon which I believe my invention to be based, I do not desire to thereby limit my invention, which I desire to stand upon its structural details and the results produced thereby rather than upon the correctness of the theory, I may say, however, that the invention was originally based upon empirical reasoning rather than experimentation.

I take a piece of sky blue glass, such as the piece A (Figure 1) and engrave it with a series of parallel or roughly parallel lines, which should act to form a series of very fine prisms on the surface of the glass. Thus as indicated in Figure 1, if a glass B should be used, the grooves C should be in the form of prisms abutting each other across the surface of the glass.

In order to avoid confusion as to scale, I have noted on Figure 1 the depth of the grooves as being one hundredth of an inch and the space between crests left between the grooves as fifteen-thousandths of an inch.

Referring to Figure 2, I have shown very greatly enlarged, a pair of the prism-like structures formed on the glass A and a source of light S. The lines drawn are intended to indicate the path of a pencil of light into the prisms where it will be noted that the light is deflected with the violet ray V receiving more deflection than the red ray R, and thus the violet ray, upon the reflection from the inside and outside of the walls of the grooves, being directed outwardly and the red rays being deflected back into the glass.

Thus when a piece of blue glass, be it flat or curved, is held up to day-light, it will show plainly to the eye a sort of iridescent purple hue along the edges where the brightness of the light passing through the glass does not obscure it.

Ordinary frosting of a piece of glass does not serve my purpose at all, nor would a series of criss-cross lines, so far as I am advised. In my experiments I have determined that the best results are obtained where the lines bear the nearest parallelism to each other and are regularly cut or engraved, so as to give a magnified appearance, such as I have shown in Figure 1.

Due to the fact that I find no difference if the transparent medium is flat or curved, I gain advantage of my invention in many ways. Thus in Figure 3 I may use the special glass X of sky blue with parallel, closely adjacent scorings or grooves therein, in the form of a bulb 1.

Figure 4:
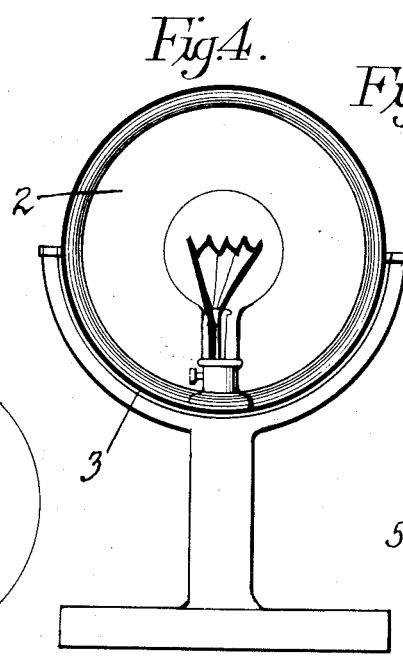
Figure 4 is an elevation of a vehicle lamp illustrating another application of my invention.

In Figure 4 the special glass is shown as making up the door 2 of a vehicle lamp 3.

Figure 5:
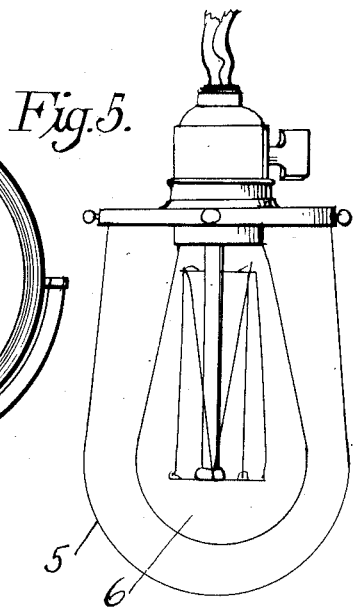
Figure 5 is an elevation of an ordinary light bulb with a hood or cover embodying my invention.

In Figure 5, the special glass is shown as formed into a transparent housing 5 for an ordinary electric globe 6.

Figures 6, 7:
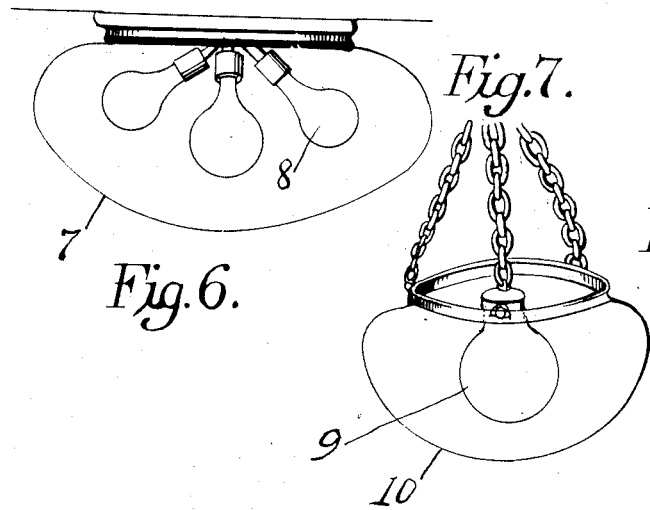
Figure 6 is an illustration of a dome light with a shade embodying my invention.
Figure 7 is a perspective of a hanging light with a shade embodying my invention.
Figure 8:
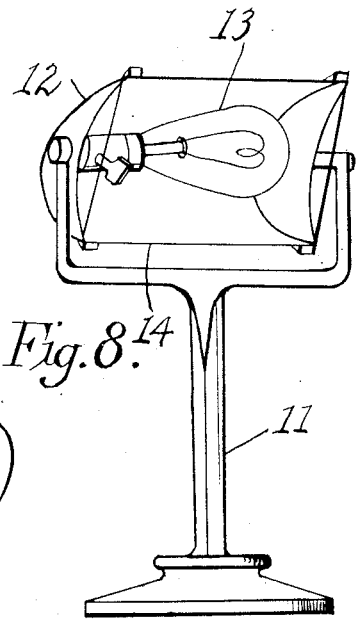
Figure 8 is a perspective of a desk lamp showing the use of a cover plate thereon, which embodies my invention.

In Figure 6 is shown a dome-shaped globe 7 placed over a cluster of ceiling lights 8. In Figure 7 is a hanging lamp having electric bulbs 9 and a globe 10 of the special glass, and in Figure 8 is shown a desk lamp having a standard 11, on which is supported a shade 12 that houses a bulb 13. Over the face of the reflector I have placed a sheet of my special glass as at 14.

As heretofore stated, the reasons for my success in getting an artificial light approaching that of daylight are not stated as limitations thereof, but the structure and composition of the special glass and the results of use thereof I wish to clearly state.

Thus I have found that artists working on living models especially find it impossible to get correct shadings by any form of colored glass heretofore known to them, including exactly the same cerulean blue which I employ as above noted, with bulbs of cerulean blue engraved with the lines, as by any desired form of ruling engine, artists have for some time been painting at night in life classes with perfect success.

Because of the experience of artists who are specially skilled in the determination of delicate shadings of color, I am convinced that by my invention I have so treated the rays of light coming from an incandescent filament that they are of precisely the same color-revealing property as sunlight acted upon by the atmosphere of the earth.

Having thus described my invention, what I claim as new and desire to secure by Letters Patent, is:—

1. A glass for transmission of light, comprising a body of bluish color with a series of fine markings substantially parallel to each other engraved in the surface thereof, for the purpose described.

2. A glass for transmission of light, comprising a body of bluish color, said body being engraved in its surface with a series of angular grooves substantially parallel to each other, so as to impart a prismatic nature to said surface.

3. A glass for transmission of light, comprising a body of bluish color, said body being engraved in its surface with a series of closely adjacent tapered grooves lying substantially parallel to each other and having a triangular ridge between them, so as to impart a prismatic effect to the glass.

4. A glass for transmission of light, comprising a body of bluish color, said body being engraved in its surface with a series of closely adjacent tapered grooves lying substantially parallel to each other and having a triangular ridge between them, so as to impart a prismatic effect to the glass, said grooves having a depth of substantially one hundredth of an inch or less.

FRANK H. BAILEY.